United States Patent
Wu et al.

(10) Patent No.: US 6,582,804 B2
(45) Date of Patent: Jun. 24, 2003

(54) CURABLE INKJET PRINTABLE INK COMPOSITIONS

(75) Inventors: Dong Wu, Woodbury, MN (US); Junkang Liu, Woodbury, MN (US); Kathleen A. Dennison, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/217,244

(22) Filed: Aug. 12, 2002

(65) Prior Publication Data

US 2003/0031843 A1 Feb. 13, 2003

Related U.S. Application Data

(62) Division of application No. 09/430,913, filed on Nov. 1, 1999, now Pat. No. 6,461,419.

(51) Int. Cl.[7] .............................................. B23B 27/14
(52) U.S. Cl. ...................................................... 428/195
(58) Field of Search .................................. 428/195, 426, 428/446, 480, 492, 500, 521, 688

(56) References Cited

U.S. PATENT DOCUMENTS

| 4,101,513 A | * | 7/1978 | Fox et al. .................... 526/193 |
| 4,336,309 A | * | 6/1982 | Jackel et al. ................ 427/447 |
| 4,338,133 A | * | 7/1982 | Toyoda et al. ................ 106/22 |
| 5,091,468 A | * | 2/1992 | Takeuchi .................... 524/761 |
| 5,106,658 A | * | 4/1992 | Burkhardt et al. ........... 427/387 |
| 5,286,815 A | * | 2/1994 | Leir et al. ................... 525/477 |
| 5,340,898 A | * | 8/1994 | Cavezzan et al. ............. 529/19 |
| 5,514,728 A | * | 5/1996 | Lamanna et al. ............. 522/31 |
| 5,554,664 A | | 9/1996 | Lamanna et al. |
| 5,935,311 A | * | 8/1999 | Matsumura et al. ...... 106/31.43 |
| 6,461,419 B1 | * | 10/2002 | Wu et al. .................. 106/31.6 |

FOREIGN PATENT DOCUMENTS

| DE | 3120534 | | 6/1982 |
| EP | 0 339 257 A2 | | 11/1989 |
| EP | 670290 | | 9/1995 |
| EP | 856566 | | 8/1998 |
| JP | 49082406 | | 8/1974 |
| JP | 56163170 | | 12/1981 |
| JP | 63048372 | | 3/1988 |
| JP | 7331140 | | 12/1995 |
| JP | 9211219 | | 8/1997 |
| JP | 9279075 | | 10/1997 |
| WO | WO 81/02579 | * | 9/1981 |

* cited by examiner

Primary Examiner—Cynthia H. Kelly
Assistant Examiner—B. Shewareged
(74) Attorney, Agent, or Firm—Scott A. Bardell; Carolyn V. Peters

(57) ABSTRACT

The invention provides curable ink compositions that are inkjet printable and that adhere to a variety of substrates, for example, glass and polymer. The ink compositions of the invention can be formulated so to provide cured inks that are very flexible or very rigid depending upon the desired application. The invention provides a cure-on-demand curable ink composition comprising a homogeneous mixture of at least one of: (a) a compound having 2 reactive silyl groups, and (b) a compound having at least 3 reactive silyl groups; acid generating catalyst; and pigment or pigment chip. The invention also provides methods of making and using the ink compositions and imaged articles.

3 Claims, No Drawings

CURABLE INKJET PRINTABLE INK COMPOSITIONS

CROSS REFERENCE TO RELATED APPLICATIONS

This application is a divisional of U.S. application Ser. No. 09/430,913, filed Nov. 1, 1999, now allowed as U.S. Pat. No. 6,461,419, the disclosure of which is herein incorporated by reference.

FIELD OF THE INVENTION

This invention relates to moisture curable ink compositions, particularly to those having reactive silyl functionality and their use.

BACKGROUND OF THE INVENTION

Moisture-curable compositions cure in the presence of moisture to form crosslinked materials. The moisture is typically obtained from the atmosphere or from a substrate to which the composition has been applied, although it may be added to the composition.

Most moisture-curable compositions are based on isocyanate containing compounds. However, these compositions have well known disadvantages. Other moisture-curable compositions comprise polymers having groups (for example, alkoxysilyl or acyloxysilyl moieties) that react in the presence of moisture to form cured (i.e., crosslinked) materials. Moisture-curable compositions comprising alkoxysilyl or acyloxysilyl functionality typically cure in two reactions. In the first reaction, the alkoxysilyl or acyloxysilyl groups hydrolyze in the presence of moisture and a catalyst to form compounds having silanol groups. In the second reaction, the silanol groups condense with other silanol, alkoxysilyl, or acyloxysilyl groups in the presence of a catalyst to form —Si—O—Si— linkages. The two reactions occur essentially simultaneously upon generation of the silanol-functional compound. Commonly used catalysts for the two reactions include Brönsted and Lewis acids. A single material may catalyze both reactions.

The hydrolysis reaction is schematically illustrated below for a polymer having alkoxysilyl groups:

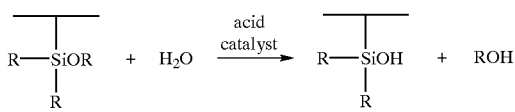

The resulting silanol (SiOH) groups are not stable in the presence of the acid catalyst and immediately condense with other silanol or alkoxysilyl group to form —Si—O—Si— linkages as shown below schematically for the condensation reaction of a silanol-functional compound and an alkoxysilyl-functional compound:

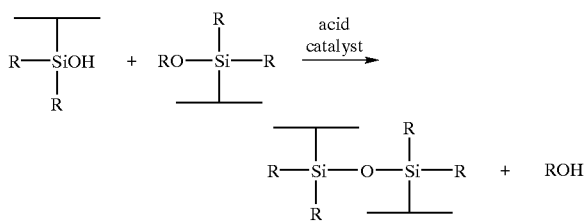

Preferably, the hydrolysis and condensation reactions proceed quickly once the moisture-curable composition has been applied, for example, to a substrate.

Such compositions have been described as being useful as adhesives, sealants, and coatings.

Some known silane ink compositions contain an acid or a base added as catalysts in the ink binder. Such inks tend to have short pot-lives. The shelf life of such ink compositions is dependent upon the concentration of hydrolyzible silane compounds so the inks typically contain large amounts of solvents or water. Attempts to increase the shelf life of such inks include first hydrolyzing and condensing the alkoxysilyl compounds under controlled conditions and then use the reaction product as part of the ink binder.

Other curable siloxane ink compositions do not contain a catalyst, in some instances, to increase that storage stability of the ink. These inks require that they be heated to 150–200° C. for 5–10 minutes to accelerate the hydrolysis reaction or that they are reacted very slowly at controlled temperature and humidity. Inks that require heating are not suitable for use on substrates that have a relatively low melting point or are easily distorted with heat. And, such slow curing will affect the printing resolution, due to uncontrolled spread of the drops, and color bleeding.

Most curable inks are based on acrylate and epoxy chemistries. The acrylate based inks cure rapidly by free-radical reaction and have good weatherability. However, the acrylate-based inks also typically suffer from oxygen inhibition during cure and surface shrinkage that can contribute to low gloss.

Epoxy-based inks have less shrinkage than acrylate-based inks, provide good adhesion, and have no oxygen inhibition during cure. However, epoxy-based inks typically provide poor weatherability and may have relatively slow cationic reaction rates as compared to free radical reaction rates.

SUMMARY OF THE INVENTION

The invention provides curable ink compositions that are inkjet printable and that adhere to a variety of substrates, for example, glass and polymer. "Curable" means that either reactive silyl groups hydrolyze in the presence of moisture to form compounds having silanol groups that react in the presence of an activated catalyst to form —Si—O—Si— linkages or silanol groups react in the presence of an activated catalyst to form —Si—O—Si— linkages.

The ink compositions of the invention can be formulated so as to provide cured inks that are very flexible, that is, polydimethylsiloxane, or very rigid, that is, silicate, depending upon the desired application. The curable ink compositions are also shelf stable and are cured-on-demand in that they may be cured rapidly at a predetermined time. "Shelf stable" means that the compositions are stable in a light protected container for at least 3 weeks and preferably for at least 6 months. The ink compositions of the invention also provide inks having high gloss and transparency. The ink compositions of the invention also are not required to be diluted with water or solvent in order to be stable.

In one aspect, the invention provides a cure-on-demand curable ink composition comprising a homogeneous mixture of at least one of: (a) a compound having 2 reactive silyl groups, and (b) a compound having at least 3 reactive silyl groups; acid generating catalyst; and pigment or pigment chip. The acid generating catalyst may be activated (liberate a Brönsted or Lewis acid) by heat or irradiating the composition with, for example, ultraviolet, visible light, electron beam, or microwave radiation.

In another aspect, the invention provides inks that are ink-jet printable.

In another aspect, the invention provides imaged ceramic articles comprising a cured ink composition of the invention on a ceramic substrate.

In another aspect, the invention provides a method of making a cure-on-demand curable ink composition comprising the steps of:

sequentially combining a compound having at least 3 reactive silyl groups, pigment chip, and acid generating catalyst with constant mixing.

In another aspect, the invention provides a method of forming an imaged article comprising the step of inkjet printing a moisture curable ink composition of the invention onto a substrate.

In another aspect, the invention provides a cure-on-demand curable composition for overprinting images comprising a homogeneous mixture of at least one of: (a) a compound having 2 reactive silyl groups, and (b) a compound having at least 3 reactive silyl groups; and acid generating catalyst.

The curable ink compositions of the invention can be formulated to have excellent adhesion to a variety of substrates, for example, those of polymethylmethacrylate (PMMA), silicone rubber, ceramics, and glass. The ink compositions of the invention also cure rapidly at room temperature and are expected to have excellent outdoor weatherability due to their inorganic backbone.

DETAILED DESCRIPTION OF THE INVENTION

Reactive Silyl Functional Compounds

The curable ink compositions of the invention contain at least one of 1) a compound having at least two reactive silyl groups per molecule, typically a silicon atom bonded to either two hydroxysilyl groups or two alkoxysilyl groups and 2) a compound having at least 3 reactive silyl groups per molecule. The ink compositions of the invention also may contain a mixture of compounds from both of the above classes of compounds.

Reactive silyl functional compounds useful in the invention can incorporate a wide variety of backbones to support the reactive silyl groups and, as a result, such compounds may be generally represented by the following structures:

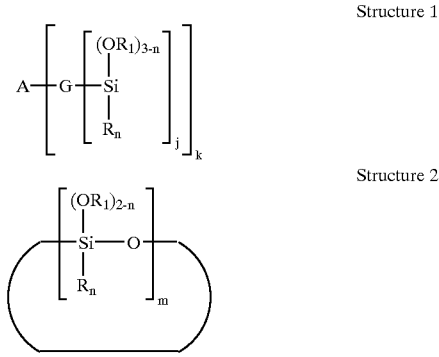

wherein,

A is a k-valent group which may be selected from, for example, a chemical bond (i.e., no atoms); —OR; alkyl groups (preferably having 1 to 30, more preferably, 12 to 20 carbon atoms); cycloalkyl groups (preferably having 3 to 30, more preferably, 6 to 10 carbon atoms), aryl groups (preferably having from 6 to about 30 carbon atoms); a chalcogen (group VIb elements), such as oxygen, sulfur, etc., and polymeric radicals which may be of linear, branched, block, or graft construction. Non-limiting examples of suitable polymeric groups include polysiloxanes, polyacrylates, polyamides, polyolefins, polyethers, polyesters, polyurethanes and polyphosphazenes, as well as derivatives and combinations thereof. The polymeric groups may be hydroxy-(to form a silanol), acyloxy-, or alkoxy-terminated or may have pendent silanol, acyloxysilyl, or alkoxysilyl groups.

Each G independently represents an optional multi-valent group having a valence of at least 2. Non-limiting examples of G include —Si(OR)$_x$— wherein x=0–2, hydrocarbon diyls and oxydiyls, particularly alkanediyls and oxydiyls, such as methylidene, ethylidene, 1,3-propanediyl, 1,5-pentanediyl, 2-oxo-propanediyl, phenylene (an arenediyl); chalcogens, such as oxygen, sulfur, etc.; hydrocarbon triyls, such as, for example, pentaerythritoltriyl; and the like. The exact nature of G is not critical so long as it does not contain groups that inhibit the condensation cure of alkoxy- or hydroxysilyl groups.

Each $R_1$ independently represents hydrogen, an alkyl group (preferably having 1 to 30, more preferably, 1 to 4 carbon atoms), a cycloalkyl group (preferably having 3 to 30, more preferably, 6 to 10 carbon atoms), an alkanoyl group (preferably having 2 to 30, more preferably, 2 to 4 carbon atoms), or an aroyl group (preferably having from 7 to about 30 carbon atoms).

Each R independently represents hydrogen, an alkyl group (preferably having 1 to 30, more preferably, 1 to 10 carbon atoms), a cycloalkyl group (preferably having 3 to 30, more preferably, 6 to 10 carbon atoms), an alkanoyl group (preferably having 2 to 30, more preferably, 2 to 10 carbon atoms), or an aroyl group (preferably having from 7 to about 30 carbon atoms).

Each n is either 0, 1, or 2 with the proviso that compounds from either Structure 1 or Structure 2 above have at least two reactive silyl groups; each j independently represents 0 or an integer greater than or equal to 1; k represents an integer greater than or equal to 1; and m represents an integer greater than or equal to 3.

As is well understood in this area, substitution is not only tolerated, but also is often advisable and substitution is anticipated on the compounds used in the present invention. As a means of simplifying the discussion and recitation of certain substituent groups, the terms "group" and "moiety" are used to differentiate between those chemical species that may be substituted and those which may not be so substituted. Thus, when the term "group" or "aryl group" is used to describe a substituent, that substituent includes the use of additional substituents beyond the literal definition of the basic group. Where the term "moiety" is used to describe a substituent, only the unsubstituted group is intended to be included. For example, the phrase, "alkyl group" is intended to include not only pure hydrocarbon alkyl chains, such as methyl, ethyl, propyl, t-butyl, cyclohexyl, iso-octyl, octadecyl and the like, but also alkyl chains bearing substituents known in the art, such as hydroxyl, alkoxy, phenyl, halogen atoms (F, Cl, Br, and I), cyano, nitro, carboxy, etc. For example, alkyl group includes ether groups (e.g., CH$_2$ CH$_2$ CH$_2$ —O—), haloalkyls, nitroalkyls, carboxyalkyls, hydroxyalkyls, sulfoalkyls, etc.

On the other hand, the phrase "alkyl moiety" is limited to the inclusion of only pure hydrocarbon alkyl chains, such as methyl, ethyl, propyl, t-butyl, iso-octyl, octadecyl, and the like. Substituents that react with active ingredients, such as very strongly electrophilic or oxidizing substituents, or basic materials that would substantially interfere with the cationic curing catalyst (e.g., tertiary amines, etc.) would of course be excluded by the ordinarily skilled artisan as not being inert or harmless.

As noted above, preferred groups for radical A include silanol- or alkoxy-terminated polysiloxanes, polyacrylates, polyolefins and polyethers.

1. Difunctional Silane Compounds

The compositions of the invention can contain at least one difunctional silane compound, for example, having either two silanol groups or two alkoxysilyl groups per molecule. These compounds provide a polymer backbone and adjust crosslink density of the cured inks.

Nonlimiting, specific examples of compounds described above include hydroxy and/or alkoxy terminated polydimethylsiloxanes having a molecular weight of 400 to 150,000; hydroxy and/or alkoxy terminated diphenylsiloxane-dimethylsiloxane copolymers; hydroxy and/or alkoxy terminated polydiphenylsiloxanes; hydroxysilyl and/or alkoxysilyl terminated polytrifluoropropylmethylsiloxanes, polyesters, polyurethanes, and polyacrylates; dialkyl- and substituted dialkyl-dialkoxysilanes, such as diethyldiethoxysilane, dimethyldimethoxysilane, diethyldiethoxysilane, diisobutyldimethoxysilane, dimethyldiethoxysilane, diisopropyldimethoxysilane, bis(3-cyanopropyl)dimethoxysilane, (2-chloroethyl)methyldimethoxysilane, chloromethylmethyldiethoxysilane, (2-chloroethyl)methyldiisopropoxysilane, (3-chloropropyl)methyldimethoxysilane, (3-cyanopropyl)methyldimethoxysilane, cyclohexylethyldimethoxysilane, dodecylmethyldiethoxysilane, isobutylmethyldimethoxysilane, 3-mercaptopropylmethyldimethoxysilane; mercaptomethylmethyldiethsysilane, methacryloxypropylmethyldiethoxysilane, methacryloxypropylmethyldimethoxysilane, methyldiethoxysilane, methyldimethoxysilane, n-octadecylmethyldiethoxysilane; n-octylmethyldiethoxysilane, dicyclopentyldimethoxysilane, etc.; aryl and diaryl substituted alkoxysilanes, such as diphenyldimethoxysilane, phenyldiethoxysilane, phenylmethyldiethoxysilane, phenylmethyldimethoxysilane, etc.; hydroxysilyl and alkoxysilyl substituted arenes, such as 1,4-bis(hydroxydimethylsilyl)benzene, 1,3-bis(methoxydimethylsilyl)benzene, etc.; trialkylsilyl substituted alkoxysilanes, such as bis(trimethylsilylmethyl) dimethoxysilane, trimethylsilylmethyldimethoxysilane, etc.; cyclic alkoxysilanes, such as 1,1-diethoxy-1-silacyclopent-3-ene, etc.; acyloxy substituted silanes, such as dimethyldiacetoxysilane, vinylmethyldiacetoxysilane, diethylbenzoyloxyacetoxysilane, etc; geminal silanediols, such as diphenylsilanediol, dicyclohexylsilanediol, etc.; alkyl and/or aryl substituted cyclic siloxanes, such as 3-(3,3-trifluoropropyl)heptamethyltrisiloxane, hexamethyltrisiloxane, octamethyltetrasiloxane, etc.; alkenyl substituted alkoxysilanes, such as vinylmethyldiethoxysilane, vinylmethyldimethoxysilane, vinylphenyldiethoxysilane, and the like.

Presently preferred compounds having 2 reactive silyl groups are hydroxy terminated polydimethylsiloxanes and polydiethylsiloxanes (i.e., having Si—OH terminal groups).

2. Silanes Having at Least 3 Reactive Silyl Groups

The compositions of the invention can contain at least one compound having at least 3 and preferably, from 4 to 6 reactive silyl groups per molecule. The reactive silyl groups can be, for example, alkoxy silyl or acyloxy silyl groups.

Nonlimiting, specific examples of compounds described above include trifunctional crosslinkers, such as, for example, isobutyltrimethoxysilane, methytriethoxysilane, methytrimethoxysilane, octyltriethoxysilane, propyltrimethoxysilane, phenyltrimethoxysilane, chloropropyltriethoxysilane, chloroproyltrimethoxysilane, mercaptopropyltrimethoxysilane, glycidyloxypropyltrimethoxysilane, methacryloxypropyltrimethoxysilane, vinyltriethoxysilane, vinyltrimethoxysilane; tetrafunctional crosslinkers, such as, for example, tetramethoxysilane, tetraethoxysilane, 1,3-dimethyltetramethoxydisiloxane, 1,3-di-n-octyltetramethoxydisiloxane, 1,3-divinyltetraethoxydisiloxane, 1,1,3,3-tetraethoxy-1,3-dimethyldisiloxane, tetrakis(butoxyethoxyethoxy)silane, tetrakis(ethoxyethoxy)silane, tetrakis(trimethylsiloxy)silane, tetrakis(2-ethylhexoxy)silane, tetrakis(2-methacryloxyethoxysilane), tetrakis(methoxyethoxyethoxy)silane, tetrakis(methoxyethoxy)silane, tetrakis(methoxypropoxy)silane, tetra-n-propoxysilane; higher functionality crosslinkers, such as bis[3-(methyldimethoxysilyl)propyl]-polypropylene oxide, bis(triethoxysilyl)ethane, bis(triethoxysilyl)ethylene, bio(triethoxysilyl)methane, 1,9-bis(triethoxysilyl)nonane, bis(triethoxysilyl) 1,7-octadiene, bis(triethoxysilyl)octane, bis[3-(triethoxysilyl)propyl]-tetrasulfide, bis(3-(triethoxysilyl)propyl)urea, bis(trimethoxysilyl)ethane, 1,4-bis(trimethoxysilylethyl)benzene, bis(trimethoxysilyl)hexane, bis(trimethylsiloxy)cyclobutene, di-t-butoxydiacetoxysilane, hexamethoxydisilane, hexaethoxydisilane, tetraacetoxysilane, tetraallyloxysilane, tetra-n-butoxysilane, 1-(triethoxysilyl)-2-(diethoxymethylsilyl)ethane, and functional polymers, such as poly(diethoxysiloxane), diethoxysiloxane-s-butylaluminate copolymers, diethoxysiloxane-ethyltitanate copolymers, diethoxysiloxane-ethyl phosphate copolymers, and the like.

Presently preferred compounds having 3 or more reactive silane groups are 1,3-dimethyltetramethoxydisiloxane, methacryloxypropyltrimethoxysilane, tetraethoxysilane, 1,3-dioctyltetramethoxydisiloxane, glycidoxypropyltrimethoxysilane, 3-bromopropyltrimethoxysilane, and dioctyltetraethoxydisiloxane.

Preferably, the reactive silyl functional groups are the only acid curable groups in the ink composition.

Acid Generating Catalysts

Upon activation, the acid generating catalyst liberates an acid that initiates and/or accelerates curing (i.e., crosslinking) of the curable ink composition. In order to facilitate more rapid curing, the liberated acid preferably has a pKa of less than about 3, more preferably less than about 1. Activation may be accomplished by heat or irradiating the composition with, for example, ultraviolet, visible light, electron beam or microwave radiation. Moisture required for the initial hydrolysis reaction of the curing mechanism may be obtained from, for example, the substrate, the composition itself, or, most commonly, atmospheric humidity. The catalyst is typically present in an amount of about 0.5 to about 20 parts by weight, preferably from about 1 to about 10 parts by weight, more preferably from about 2 to about 7 parts by weight based on 100 parts by weight reactive silane functional compounds.

A variety of catalysts may be used in the practice of the invention except for those containing basic species, such as ammonium salts disclosed in U.S. Pat. No. 5,286,815 that generate an amine that may inhibit the curing reaction of the cure-on-demand composition of this invention. Thus, catalysts of the present invention are substantially free of ammonium salts. Minor amounts of such salts may be tolerated without greatly affecting the care rate. Particularly desired catalysts for use in this invention are those that are capable of releasing an acid upon exposure to ultraviolet or visible light or upon exposure to electron beam irradiation. Preferably, the catalyst comprises an onium salt because of their capacity to simultaneously generate a strong acid and an energetic free radical when activated.

Onium salts suitable for use in the present invention are preferably sulfonium or iodonium salts having the following structure:

$$L_w\text{-}Y^+MX^-$$

Structure 3

L is an aryl or substituted aryl group; w is an integer from 2 to 4; Y is sulfur or iodine; M is a Group III, IV, or V element from the Periodic Table of the Elements; and X is a sulfate, tosylate, alkylsulfonate, fluoroalkylsulfonate, fluoroalkyl, or a perfluorinated aryl group.

Examples of useful sulfonium salts include:
triphenylsulfonium tetrafluoroborate;
triphenylsulfonium tetrakis(pentafluorobenzyl)borate;
methyldiphenylsulfonium tetrafluoroborate;
methyldiphenylsulfonium tetrakis(pentafluorobenzyl)borate;
dimethylphenylsulfonium hexafluorophosphate;
triphenylsulfonium hexafluorophosphate;
triphenylsulfonium hexafluoroantimonate;
diphenylnaphthylsulfonium hexafluoroarsenate;
tritolysulfonium hexafluorophosphate;
anisyldiphenylsulfonium hexafluorantimonate;
4-butoxyphenyldiphenylsulfonium tetrafluoroborate;
4-butoxyphenyldiphenylsulfonium tetrakis(pentafluorobenzyl)borate;
4-chlorophenyldiphenylsulfonium hexafluoroantimonate;
tris(4-phenoxyphenyl)sulfonium hexafluorophosphate;
di(4-ethoxyphenyl)methylsulfonium hexafluoroarsenate;
4-acetylphenyldiphenylsulfonium tetrafluoroborate;
4-acetylphenyldiphenylsulfonium tetrakis(pentafluorobenzyl)borate;
tris(4-thiomethoxyphenyl)sulfonium hexafluorophosphate;
di(methoxysulfonylphenyl)methylsulfonium hexafluoroantimonate;
di(methoxynaphthyl)methylsulfonium tetrafluoroborate;
di(methoxynaphthyl)methylsulfonium tetrakis(pentafluorobenzyl)borate;
di(carbomethoxyphenyl)methylsulfonium hexafluorophosphate;
(4-octyloxyphenyl)diphenylsulfonium tetrakis(3,5-bis-trifluoromethyl-phenyl)borate;
tris(dodecylphenyl)sulfonium tetrakis(3,5-bis-trifluoromethylphenyl)borate;
4-acetamidophenyldiphenylsulfonium tetrafluoroborate;
4-acetamidophenyldiphenylsulfonium tetrakis(pentafluorobenzyl)borate;
dimethylnaphthylsulfonium hexafluorophosphate;
trifluoromethyldiphenylsulfonium tetrafluoroborate;
trifluoromethyldiphenylsulfonium tetrakis(pentafluorobenzyl)borate;
phenylmethylbenzylsulfonium hexafluorophosphate;
10-methylphenoxathiinium hexafluorophosphate;
5-methylthianthrenium hexafluorophosphate;
10-phenyl-9,9-dimethylthioxanthenium hexafluorophosphate;
10-phenyl-9-oxothioxanthenium tetrafluoroborate;
10-phenyl-9-oxothioxanthenium tetrakis(pentafluorobenzyl)borate;
5-methyl-10-oxothianthrenium tetrafluoroborate;
5-methyl-10-oxothianthrenium tetrakis(pentafluorobenzyl)borate; and
5-methyl-10,10-dioxothianthrenium hexafluorophosphate.

Examples of useful iodonium salts include: di(dodecylphenyl)iodonium hexafluoroantimonate, di(dodecylphenyl)iodonium triflate; diphenyliodonium bisulfate, 4,4'-dichlorodiphenyliodonium bisulfate; 4,4'-dibromodiphenyliodonium bisulfate; 3,3'-dinitrodiphenyliodonium bisulfate; 4,4'-dimethyldiphenyliodonium bisulfate; 4,4'-bissuccinimidodiphenyliodonium bisulfate; 3-nitrodiphenyliodonium bisulfate; 4,4'-dimethoxydiphenyliodonium bisulfate, bis(dodecylphenyl)iodonium tetrakis(pentafluorophenyl)borate; (4-octyloxyphenyl)phenyliodonium tetrakis(3,5-bis-trifluoromethyl phenyl)borate; (tolylcumyl)iodonium tetrakis(pentafluorophenyl)borate $(CH_3C_6H_4)_2I$ —$(SO_2CF_3)_3$, as disclosed in U.S. Pat. No. 5,554,664; $(C_6H_5)_2I$—$B(C_6F_5)_4$, as disclosed in U.S. Pat. No. 5,514,728; and those disclosed in U.S. Pat. No. 5,340,898. A particularly preferred onium salt is di(dodecylphenyl) iodonium hexafluoroantimonate.

Onium salts are typically activated using ultraviolet radiation. Because of this, they can be advantageously employed in applications involving heat-sensitive substrates. Optionally, a sensitizer may supplement the onium salt to accelerate the liberation of the acid catalyst and typical amounts are about 0.03 to about 0.1 parts by weight, based on 100 parts by weight reactive silane functional compound. Examples of suitable sensitizers include those described in Chapter 13 of *Radiation Curing in Polymer Science and Technology*, Vol. 2, edited by Fouassier and Rabek, Elsevier Science Publishers LTD, 1993. 2-isopropylthioxanthone is a particularly preferred sensitizer for use with di(dodecylphenyl)iodonium hexafluoroantimonate.

Pigments

The ink compositions of the invention contain one or more pigments. Suitable organic and inorganic pigments include carbon black, zinc oxide, titanium dioxide, phthalocyanine, anthraquinones, perylenes, carbazoles, monoazo- and disazobenzimidazolones, rhodamines, indigoids, quinacridones, diazopyranthrones, dinitranilines, pyrazolones, diazopyranthrones, dinitranilines, pyrazolones, dianisidines, pyranthrones, tetracholoroisoindolinones, dioxazines, monoazoacrylides, and anthrapyrimidines. It will be recognized by those skilled in the art that organic pigments will be differently shaded, or even have different colors, depending on the functional groups attached to the main molecule.

Commercial examples of useful organic pigments include those known under the C.I. (i.e., Colour Index International, 3rd ed., 4th revision (1992-); The Society of Dyers and Colourists, Bradford, West Yorkshire, England) trade designations PB1, PB 15, PB 15:1, PB15:2, PB 15:3, PB 15:4, PB 15:5, PB15:6, PB16, and PB 60 (blue pigment); PB5, PB23, and PB 265 (brown pigment); PG1, PG7, PG 10, PG 36 (green pigment); PY 3, PY 14, PY 16, PY 17, PY 24, PY 65, PY73, PY 83, PY 95, PY 97, PY 108, PY 109, PY 110, PY 113, PY 128, PY 129, PY 138, PY 139, PY 150, PY 154, PY 156, and PY 175 (yellow pigment); PO 5, PO15, PO 16, PO31, PO34, PO 36, PO43, PO48, PO 51, PO 60 and PO 61 (orange pigments); PR4, PR5, PR 7, PR 9, PR222, PR23, PR48, PR48:2, PR 49, PR112, PR123, PR 149, PR166, PR 168, PR 170, PR 177, PR 179, PR 190, PR 202, PR 206, PR 207, PR 224 (red); PV 19, PV 23, PV 37, PV 32 and PV 42 (violet pigments); and PBLACK (black).

The pigments are milled so to incorporate into selected curable ink vehicles. If used as inkjet inks, the pigment preferably is less than 1 micrometer in size after milling. If the ink to be used in application wherein the ink is used in combination with a retroreflective backing, the pigment must be milled to a particle size that provide sufficient transparency to permit retroreflection and provide retroreflective color. The preferred range for the pigment particle size is about 10–400 nm, more preferably 10 to 200 nm, to provide the desired transparency.

In some cases, pigment is ground with a non-reactive binder resin which separates pigment particles and prevents them from coalescing. Such solid/solid dispersion, referred to as pigment chip, maintains pigment particle size until the pigment is ready to be incorporated into the ink. The ratio of pigment to binder resin in the supplied chip is usually about 1:1 to 9:1. Useful binder resins for use in the inks of the current invention are well known in the pigment dispersion art and include cellulosic resins, such as ethyl cellulose, cellulose acetate, nitrocellulose, etc.; acrylic resins, such as those sold under the trade designation JONCRYL from S. C. Johnson Wax, Racine, Wis.; polyacetal resins, such as polyvinyl butral (for example, those sold under the trade designation BUTVAR from Monsanto Co., St. Louis, Mo.) and polyvinyl formal (for example, those sold under the trade designation FORMVAR from Monsanto Co.); and modified rosin ester resins and the like.

The preferred pigment chip in the ink of the current invention contains pigments, such as titanium dioxide or carbon black and ethyl cellulose resin. Such pigment chips are available under the trade name MICROLITH White R-A and MICROLITH Black C-A from Ciba Specialty Chemicals Division, Newport, Del.

An effective amount of pigment is used to provide the desired color and intensity to the ink. The vehicle maybe be used, for example, in an amount ranging from about 20–99.9 percent of the weight of the total composition and a colorant from about 0.1 to 80 percent of the total composition.

Solvents

A solvent may be included in the ink compositions of the invention to decrease the viscosity of the composition. Solvent should be miscible with the other components of the ink compositions of the invention. Examples of useful solvents include ketones and alcohols. Suitable ketones include acetone, cyclohexanone, and methyl ethyl ketone. Suitable alcohols include methanol and ethanol. Other solvents that may be useful include acetonitrile, carbon tetrachloride, dichloroethane, dicloromethane, dimethylformamide, dimethylsulfoxide, ethyl acetate, diethyl ether, diisopropyl ether, tetrachloroethane, tetrahydrofuran, and trichloroethane. If present, solvent may be from 0.1 to 30 percent, preferably, 0.1 to 10 percent by weight of the ink composition, more preferably, less than 10 percent and even more preferably, solvent free.

Optional Additives

Conventional additives, such as flow agents, leveling agents, viscosity modifiers, antioxidants, hindered amine light stabilizers, UV light absorbers, electrolytes (to provide electrical conductivity), and the like, may be added to the compositions of the invention. If used, these additives may be individually present in an amount ranging from about 0.5 to 5 weight percent of the ink composition.

Ink Compositions

Preparation of stable curable ink compositions of the invention is readily accomplished through the following procedures. Preparation of stable inks of the invention is not readily achieved by simply mixing pigment into the ink vehicle.

However, it has been found that if pigment chip is being used, a dispersibility test is run to determine the ability of the at least trifunctional silane to disperse the pigment chip. The dispersibility test is as follows: 0.1 g of the pigment chip to be dispersed in the ink and having the desired particle size is added to a clear glass vial containing 1.0 g of at least trifunctional silane. The ink in the container is vigorously stirred with a stirring rod for 1 minute and then allowed to stand for about 10 minutes. If no settling of the pigment is observed when viewing through the vial, then the test is passed and is considered to be dispersible.

In the event that the pigment chip dispersibility test is passed, then the ink composition may be prepared by sequentially combining, in a container equipped with mixing means, at least trifunctional silane, pigment chip, difunctional silane, curative, and any optional solvent (to be used reduce viscosity).

In the event that the pigment chip dispersibility test is failed, then the ink composition may be prepared in a container equipped with mixing means, by sequentially combining (in order) pigment chip, sufficient solvent to create a homogeneous solution, at least a trifunctional silane, difunctional silane, curative, and any optional solvent.

In the event that regular pigment is used to make the curable ink compositions of the invention, then the ink composition may be prepared by sequentially combining, in a container equipped with mixing means, a silicone surfactant, pigment, any optional at least trifunctional silane, difunctional silane and processing for sufficient time so as to form a dispersion concentrate. Then curative and any optional solvent is added with mixing.

Useful silicone surfactants include polyalkylene oxide modified polydimethylsiloxane (mw=100–15,000 g/mol, preferably, 300–5000 g/mol). Examples include SILWET L77, L7608, L7280, L7607, L722, L7500, L7602, L7622, L7604, L7057, L7605, L7600, and L7002 and are available from Witco Corp., Greenwich, Conn.

In the event that a phthalocyanine pigment is used to make the curable ink compositions of the invention, then the ink composition may optionally also be prepared by sequentially combining, in a container equipped with mixing means, pigment, any optional at least trifunctional silane, difunctional silane, and processing for sufficient time so as to form a dispersion concentrate. Curative, and any optional solvent is added with mixing. "Mixing means" includes shearing mixers, two or three roll mills, media mills, ball mills, agitators, and the like.

The physical properties and adhesion characteristics of the inks of the invention may be tailored for specific end uses. The characteristics of the cured inks largely depend upon the ratio of difunctional silanes and at least trifunctional silanes. For example, inks that are generally pliable and have good adhesion to low surface energy substrates usually contain more difunctional silane than at least trifunctional silane. On the other hand, inks that are generally rigid and which have good adhesion to surface, such as glass and ceramic usually contain more at least trifunctional silane than difunctional silane.

The ink compositions which are generally pliable after cure contain from about 10 to about 90 weight percent compound having 2 reactive silyl groups, from about 5 to about 40 weight percent compound having at least 3 reactive silyl groups, from about 0.1 to about 20 percent by weight acid generating catalyst, and from about 0.1 to about 80 percent by weight pigment. The preferred ranges are about 30 to about 50 weight percent compound having 2 reactive silyl groups, from about 15 to about 25 weight percent of compound having at least 3 reactive silyl groups, from about 0.5 to about 5 weight percent acid generating catalyst, and from about 2 to about 15 weight percent pigment.

The ink compositions which are generally rigid after cure and have good adhesion to glass and ceramic contain from 0 to about 10 weight percent of compound having 2 reactive silyl groups, from about 40 to about 95 weight percent of compound having at least 3 reactive silyl groups, from about 0.1 to about 20 weight percent acid generating catalyst, and from about 0.2 to about 80 weight percent pigment. The preferred ranges are from about 2 to about 5 weight percent of compound having 2 reactive silyl groups, from about 50 to about 80 weight percent of compound having at least three reactive silyl groups, from about 0.5 to about 5 weight percent of acid generating catalyst, and from about 2 to about 15 weight percent pigment.

The ink compositions of the invention can have a Brookfield viscosity of up to about 50 cps (mPa s) preferably about 25 cps (mPa s), more preferably less than about 15 cps (mPa s) at 25° C.

The ink compositions of the invention may be applied to a substrate using conventional ink printing techniques, such as screen printing, flexographic, and offset, etc. However, the ink compositions of the invention are particularly well adapted for ink-jet printing techniques. Once printed, the ink compositions will react with the moisture in the ambient air and/or the catalyst will be activated by UV light and form cured ink. The cured ink may be rigid or pliable depending upon the specific formula of ingredients used.

In some instances, it may be desirable to further heat the substrate and the ink until the ink is converted into a ceramic material free of carbonaceous matter, that is, to pyrolyze the printed substrate.

Once a substrate has been imaged with ink of the invention, it may be desirable to coat the image with a pigment-free or clear coat composition to enhance weatherability and durability of the image. Such clear coat compositions can be made by combining acid generating catalyst with at least one of: (a) a compound having 2 reactive silyl groups, and (b) a compound having at least 3 reactive silyl groups. The characteristics of the clear coat compositions can be tailored as described above for the ink compositions. The clear coat compositions may be applied over the image using any means and is preferably applied over the image and/or substrate using inkjet printing techniques.

EXAMPLES

MICROLITH pigment chip was obtained from Ciba Specialty Chemicals, Pigments Division of Newport, Del.; MICROLITH A WHITE R-A is a 75 weight percent dispersion of C.I. Pigment White 6 (titanium dioxide) in an ethyl cellulose carrier resin; yellow pigment chip MICROLITH T 3R-T is a 40 weight percent dispersion of C.I. Pigment Yellow 110 in a modified rosin ester; MICROLITH A BLACK C-A is a 60 weight percent dispersion of C.I. Pigment Black 7 in an ethyl cellulose carrier resin.

RAVEN 1200 FURNACE BLACK (C.I. Pigment Black 7) was obtained from Columbian Chemical Co. Inc. of Marietta, Ga.

Ceramic media (0.3 mm) were obtained from SEPR Co. of Saint-Gobain Industrial Ceramics Inc. of Mountainside, N.J.

Viscosity measurements were made using a BROOKFIELD CAP 2000 cone-plate viscometer available from Brookfield Engineering Laboratories, Inc. of Middleboro, Mass. at a temperature of 25° C.

The printer testbed had a Modular Ink Technology of Stockholm, Sweden (MIT) printhead (30 pL drop-volume, 128 nozzle) and a motor driven table. The table moves in the Y direction and the printhead moves in the X direction and utilizes software to control the patterns. The height between the printhead to the table is about 1.5–2 mm and is available from MIT (a division of Nu-kote)

MICROFAB printhead, refers to a squeeze mood single nozzle piezoelectric inkjet printhead obtained from MicroFab Technologies, Inc. of Plano, Tex. The diameter of the printhead nozzle is 50 micrometer. The frequency of the jetting is 1 kHz. Pressure (P), voltages ($V_1$ and $V_2$) and pulse time ($T_1$ and $T_2$) were adjusted in order to achieve the optimal jetting condition. Inks were filtered with 1 micrometer glass filter before loading in the ink reservoir.

3M COLD SHRINK QSIII, is a silicone rubber medium voltage Cold Shrink splice used in distribution of electric power obtained from 3M Company of Austin, Tex.

HP 500s refers to the black ink used in 51626A HP Black Inkjet Print Cartridges, available from Hewlett-Packard Company, Inc. of Palo Alto, Calif.

Nu-kote inkjet inks were pigment dispersions in high boiling hydrocarbon solvents and were obtained from Nu-kote International, Inc. of Franklin, Tenn.

The "silicone release liner" used in the following examples was a silicone coated polyester film.

Teflon seal tape was obtained from E. I. du Pont de Nemours and Co. of Wilmington, Del.

Mayer rods were obtained from R&D Specialties of Whittier, Calif.

TCM Diamond Grade (DG) refers to 3M™ Scotchlite™ Diamond Grade™ VIP (visual impact performance) Reflective Sheeting #3970 is available from 3M Company of St. Paul, Minn.

High Intensity Sheeting (HIS) refers to 3M™ Scotchlite™ High Intensity Grade Reflective Sheeting Series #3870, available from 3M Company. "INTRATHERM YELLOW 346" is a yellow dye obtained from Crompton & Knowles Corp. of Stamford, Conn.

PIGMENT BLUE 15:1 was obtained from BASF Corp. of Budd Lake, N.J.

"RHODORSIL PHOTOINITIATOR 2074" (trade designation for [(1-methylethyl)phenyl](methylphenyl)iodonium tetrakis(pentafluorophenyl)borate) is available from Rhodia, Inc. of Cranbury, N.J.

3M Transparent Film Tape 610 is sold by 3M Company of St. Paul, Minn.

"MEK" means methyl ethyl ketone.

Methacryloxypropyltrimethoxysilane, tetraethoxysilane, 1,3-dimethyltetramethoxy-disiloxane and 3-glycidoxypropyltrimethoxysilane were obtained from United Chemical Technologies, Inc., Petrarch Systems of Bristol, Pa.

Silanol terminated polydimethylsiloxane was obtained from Gelest Inc. of Tullytown, Pa.

Triethoxysilane terminated polydimethylsiloxane was obtained from Gelest Inc.

SILWET L77 is a silicone dispersant (polyethylene oxide-silicone block copolymer, AP type (alkyl pendant chain), MW 600, PEO around 70 percent) obtained from Witco, Inc. of Greenwich, Conn.

Polydiethoxysiloxane was obtained from Gelest, Inc.

All inks prepared in the following examples were passed through a 1 micrometer diameter pore size glass filter unless otherwise noted.

Unless otherwise specified materials used in the following examples were obtained from general chemical supply sources, such as, for example, Aldrich Chemical Co. of Milwaukee, Wis.

Example 1

This example describes the preparation of a silicone based ink wherein pigment chip was used as colorant. "Silicone based" ink means an ink that is generally pliable after cure.

To 10 parts MICROLITH A WHITE R-A was added 10 parts cyclohexanone, 20 parts 1,3-dimethyltetramethoxydisiloxane, 20 parts methacryloxypropyltrimethoxysilane and 40 parts silanol terminated polydimethylsiloxane (20–35 cps (mPa s)). The ink was ground in a ball mill using 0.3 mm diameter ceramic media for 2 hours and 3 parts of RHODORSIL PHOTOINITIATOR 2074 was added with mixing. The ink was filtered with 1 micrometer diameter pore size glass filter.

The ink solution was coated onto black 3M COLD SHRINK QSIII silicone rubber with a #6 Mayer rod (wet film thickness 0.14 cm). The coating was cured with a Fusion UV Systems processor using an "H"-type bulb. Exposure conditions were 200 mJ/cm² at 50 ft/min.

After curing, the ink binder was essentially a crosslinked polysiloxane. The ink was formulated with viscosity of 10–12 centipoise (cps (mPa s)), and successfully jetted with a piezoelectric inkjet printer testbed as described above with good consistency. The ink coating showed 100 percent adhesion (as measured by 90 degree tape snap on a cross-hatched film according to ASTM D3359-95a, Test Method B), and good color contrast on the black 3M COLD SHRINK QSIII substrate. The coating remained unchanged after immersing the coated samples in 5M NaCl for 90 days and at 60° C. for 7 days. The ink coating was rubbery and very flexible and did not break when folded to 180 degrees. The ink formulation was stable after 3 month storage at room temperature.

Example 2

This example demonstrates utility of the ink prepared in Example 1. The advancing contact angle for various ink formulations are listed in Table 1 (measured according to ASTM D5946 using a Rame-Hart contact angle goniometer: A drop of liquid ink was placed on the surface of the substrate and the advancing contact angle values were measured 3 times and averaged). In each case, the silicone ink of Example 1 had superior wet out to conventional inks.

TABLE 1

Advancing Contact Angle Measurements Of Inks On Different Substrates

| | Water-based ink (HP 500s) | Oil-based ink (from Nu-kote International) | Silicone ink from Example 1 |
|---|---|---|---|
| 3M Cold Shrink ™ QSIII | 90 | 44 | 26 |
| Silicone release liner, (obtained from 3M Company of St. Paul, MN, core series: 19–9850) | 88 | 28 | 21 |
| TEFLON seal tape | 86 | 26 | 20 |

Example 3

This example describes the preparation of a silicate based ink wherein pigment chip was used as colorant. "Silicate based" refers to ink that is generally rigid after cure.

To 6 parts MICROLITH A WHITE R-A was added 75 parts tetraethoxysilane (available from Fluka Chemical Corp., Milwaukee, Wis.) and 25 parts methacryloxypropyl-trimethoxysilane. The solution was ground in a ball mill using 0.3 mm diameter ceramic media for 2 hours. Three parts of RHODORSIL PHOTOINIATOR 2074 was added with mixing and the solution was filtered. The viscosity of the ink was 13–15 cps (mPa s). The ink was coated on polymethyl methacrylate (PMMA) sheeting with a #6 Mayer rod (nominal wet film thickness was 0.14 cm). Exposure conditions were 190 mJ/cm² at 50 ft/min. The cured coating was hard and glossy.

The coating showed 100 percent adhesion on 3M Diamond Grade (DG) and 3M High Intensity Sheeting (HIS). The adhesion was measured by 90 degree tape snap on a cross-hatched film according to ASTM D3359-95a, Test Method B. 100 percent adhesion corresponding to no removal of the squares, 0 percent corresponding with removal of all squares.

Durability of the ink coating was tested. There was no change of adhesion, judging from 90 degree cross-hatch snap test using 3M tape #610 (ASTM D3359-95a, Test Method B), when the coating was immersed water for 90 days, or in acid solution (0.1 M HCl) for 90 days, or at 55° C. at 100 percent humidity for 2 days. In addition, the coating showed excellent solvent resistance (60–80 MEK double Rubs: A hammer head was fitted with a piece of felt secured by a rubber band. The device was soaked in the solvent of interest and rubbed by hand across the coating using a gentle back and forth motion (one cycle is a double rub). The number of double rubs was recorded when the coating in the rubbed area had been completely removed.) and abrasion resistance based on steel wool test consisting of lightly rubbing the surface of the ink coating with steel wool 3 double rubs.

Example 4

This example describes the preparation of a silicone based ink wherein pigment chip was used as colorant.

To 10 parts of MICROLITH A WHITE R-A was added 10 parts cyclohexanone and mixed well to form a uniform paste. Gradually, 80 parts 1,3-dimethyltetramethoxydisiloxane was added to the paste with mixing. The solution was ground in a ball mill using 2 mm diameter glass beads for 2 hours. Three parts RHODORSIL PHOTOINIATOR 2074 was added with mixing and the solution was filtered. The ink was stable for at least 1 day. It cured very fast under conditions described in Example 1, showing 10–20 percent adhesion to QSIII as described therein.

Example 5

This example describes the preparation of a silicone based ink wherein pigment chip was used as colorant.

To 20 parts of MICROLITH A WHITE R-A was added 20 parts 1-propanol and mixed well to form a uniform paste. Gradually, 60 parts 1,3-dioctyltetraethoxydisiloxane was added to the paste with mixing. Three parts RHODORSIL PHOTOINIATOR 2047 was added and the solution was ground in a ball mill using 2 mm diameter glass beads for 2 hours and filtered. The ink was stable for at least 1 day, and cured to give results as in Example 4.

Example 6

This example describes the preparation of a silicone based ink wherein pigment chip was used as colorant.

To 10 parts of MICROLITH A WHITE R-A was added 10 parts cyclohexanone and 40 parts tetraethoxysilane and mixed well to form a uniform paste. Gradually, 40 parts silanol terminated polydimethylsiloxane (20–35 cps (mPa s)) was added to the paste with mixing. The solution was ground in a ball mill using 2 mm diameter glass beads for 2 hours. Three parts RHODORSIL PHOTOINIATOR 2074 was added with mixing and the solution was filtered. The ink was stable up to 1 day. The ink cured very fast according the conditions of Example 1, and exhibited 20–30 percent adhesion to QS III as described therein.

Example 7

This example describes the preparation of a silicone based ink wherein pigment chip was used as colorant.

To 10 parts of MICROLITH A WHITE R-A was added 10 parts cyclohexanone, 20 parts methacryloxypropyltrimethoxysilane and 20 parts 1,3-dioctyltetraethoxydisiloxane and mixed well to form a uniform paste. Gradually, 40 parts silanol terminated polydimethylsiloxane (20–35 cps (mPa s)) was added to the paste with mixing. The ink was ground in a ball mill using 2 mm diameter glass beads for 2 hours. Three parts RHODORSIL PHOTOINIATOR were added with mixing and the ink was filtered. The ink which had a viscosity of 31 cps (mPa s) was stable for at least 3 days. The ink cured rapidly under the conditions described in Example 1 and had 100 percent adhesion to QS III as described therein.

Example 8

This example describes the preparation of a silicone based ink wherein pigment chip was used as colorant.

To 10 parts of MICROLITH A WHITE R-A was added 10 parts cyclohexanone, 20 parts methacryloxypropyltrimethoxysilane and 20 parts 1,3-dioctyltetraethoxydisiloxane and mixed well to form a uniform paste. Gradually, 80 parts silanol terminated polydimethylsiloxane (20–35 cps (mPa s)) was added to the paste with mixing. The ink was ground in a ball mill using 0.3 mm diameter ceramic media for 2 hours and 3 parts RHODORSIL PHOTOINIATOR were added with mixing. The ink was filtered with 1 micrometer diameter pore size glass filter. The ink which had a viscosity of 33 cps (mPa s) was stable for at least 3 days. The ink cured rapidly under the conditions described in Example 1 and had 100 percent adhesion to 3M COLD SHRINK QS III substrate as described therein.

Example 9

This example describes the preparation of a silicone based ink wherein pigment chip was used as colorant.

To 10 parts of MICROLITH A WHITE R-A was added 10 parts cyclohexanone, 20 parts methacryloxypropyltrimethoxysilane and 20 parts tetraethoxysilane and mixed well to form a uniform paste. Gradually, 40 parts silanol terminated polydimethylsiloxane (20–35 cps (mPa s)) was added to the paste with mixing. The ink was ground in a ball mill using 0.3 mm diameter ceramic media for 2 hours and 3 parts RHODORSIL PHOTOINIATOR were added with mixing. The ink was filtered with 1 micrometer diameter pore size glass filter. The ink was stable for at least 7 days. The ink cured rapidly under the conditions described in Example 1 and had good wetting and 70 percent adhesion to silicone release liner as described in Example 2.

Example 10

This example describes the preparation of a silicate based ink wherein pigment chip was used as colorant.

To 7 parts MICROLITH A WHITE R-A were added 10 parts cyclohexanone, 20 parts 1,3-dimethyltetramethoxydisiloxane, 20 parts methacryloxypropyltrimethoxysilane and 40 parts silanol terminated polydimethylsiloxane (20–35 cps (mPa s)). The ink was ground in a ball mill using 0.3 mm diameter ceramic media for 2 hours and 3 parts RHODORSIL PHOTOINITIATOR 2074 were added with mixing. The ink was filtered with 1 micrometer diameter pore size glass filter. The ink, which had a viscosity of 13 cps (mPa s), was stable for at least 7 days. It cured quickly under conditions as described in Example 1, and had 100 percent adhesion to QS III as described therein. The ink was successfully inkjet printed as described in Example 1.

Example 11

This example describes the preparation of a silicone based ink wherein pigment chip was used as colorant.

To 10 parts MICROLITH A BLACK C-A pigment chip was added 10 parts cyclohexanone, 20 parts 1,3-dimethyltetramethoxydisiloxane, 20 parts methacryloxypropyltrimethoxysilane and 40 parts silanol terminated polydimethylsiloxane (20–35 cps (mPa s)). The ink was ground in a ball mill using 0.3 mm diameter ceramic media for 2 hours and 3 parts of RHODORSIL PHOTOINIATOR 2074 was added with mixing. The ink was filtered with 1 micrometer diameter pore size glass filter. The ink was stable for at least 7 days. After curing under conditions as described in Example 1, it gave a glossy ink with 80 percent adhesion to 3M High Intensity Sheeting as described therein. Some dewets were observed in the coating.

Example 12

This example describes the preparation of a silicate based ink wherein pigment chip was used as colorant.

To 10 parts Microlith A Black C-A pigment chip was added 10 parts cyclohexanone, 20 parts tetraethoxysilane, 20 parts methacryloxypropyltrimethoxysilane and 40 parts silanol terminated polydimethylsiloxane (20–35 cps (mPa s)). The ink was ground in a ball mill using 0.3 mm diameter ceramic media for 2 hours and 3 parts RHODORSIL PHO- TOINIATOR were added with mixing. The ink was filtered with 1 micrometer diameter pore size glass filter. The ink was stable for at least 7 days. After curing under conditions as described in Example 1, it gave a glossy ink with 0 percent adhesion to 3M High Intensity Sheeting as described therein. No dewets were observed in the coating.

Example 13

This example describes the preparation of a silicate based ink wherein pigment chip was used as colorant.

To 10 parts Microlith A Black C-A pigment chip was added 10 parts cyclohexanone, 40 parts tetraethoxysilane, 20 parts methacryloxypropyltrimethoxysilane and 20 parts silanol terminated polydimethylsiloxane (20–35 cps (mPa s)). The ink was ground in a ball mill using 0.3 mm diameter ceramic media for 2 hours and 3 parts of RHODORSIL PHOTOINIATOR 2074 was added with mixing. The ink was filtered with 1 micrometer diameter pore size glass filter. The ink was stable for at least 7 days. After curing under conditions as described in Example 1, it gave a glossy ink with 0 to 30 percent adhesion to 3M High Intensity Sheeting as described therein. No dewets were observed in the coating.

Example 14

This example describes the preparation of a silicate based ink wherein pigment chip was used as colorant.

To 10 parts MICROLITH A BLACK C-A pigment chip was added 10 parts cyclohexanone, 40 parts tetraethoxysilane and 40 parts silanol terminated polydimethylsiloxane (20–35 cps (mPa s)). The ink was ground in a ball mill using 0.3 mm diameter ceramic media for 2 hours and 3 parts of RHODORSIL PHOTOINIATOR 2074 was added with mixing. The ink was filtered with 1 micrometer diameter pore size glass filter. The ink was stable for at least 7 days. After curing under conditions as described in Example 1, 60 to 80 percent adhesion to 3M High Intensity Sheeting was observed as described therein. No dewets were observed in the coating.

Example 15

This example describes the preparation of a silicate based ink wherein pigment chip was used as colorant.

To 10 parts MICROLITH A BLACK C-A pigment chip was added 10 parts cyclohexanone, 60 parts tetraethoxysilane and 20 parts methacryloxypropyltrimethoxysilane. The ink was ground in a ball mill using 0.3 mm diameter ceramic media for 2 hours and 3 parts of RHODORSIL PHOTOINIATOR 2074 was added with mixing. The ink was filtered with 1 micrometer diameter pore size glass filter. The ink was stable for at least 7 days. After curing under conditions as described in Example 1, it gave a glossy ink with 60 to 80 percent adhesion to both 3M High Intensity and 3M Diamond Grade Sheeting was observed as described therein. No dewets were observed in the coating.

Example 16

This example describes the preparation of a silicate based ink wherein pigment chip was used as colorant.

To 10 parts MICROLITH A BLACK C-A pigment chip was added 67.5 parts tetraethoxysilane and 22.5 parts methacryloxypropyltrimethoxysilane. The ink was ground in a ball mill using 0.3 mm diameter ceramic media for 2 hours and 3 parts of RHODORSIL PHOTOINIATOR 2074 was added with mixing. The ink was filtered with 1 micrometer diameter pore size glass filter. The ink was stable for at least 14 days. After curing under conditions as described in Example 1, it gave a glossy ink with 100 percent adhesion to both 3M High Intensity and 3M Diamond Grade Sheeting was observed as described therein. No dewets were observed in the coating.

Example 17

This example demonstrates the utility of inks according to the present invention. Unless otherwise specified inks were coated and cured as described in Example 1.

| Ink Composition | Substrate | Method of application | Ink Adhesion |
|---|---|---|---|
| Silicone ink from Example 10 | Silicone rubber QSIII | #6 Mayer rod | 100% |
| | | Microfab printhead | 100% |
| | | Testbed printer (MIT printhead) | 80%* |
| | Silicone release liner | Meyer coat | 70% |
| | | Testbed printer (MIT printhead) | 50% |
| | Fluoropolymer | #6 Mayer rod | 5–10% |
| | | Testbed printer (MIT printhead) | 10% |
| | S-BOPP | #6 Mayer rod | 100% |
| | PET | #6 Mayer rod | 100% |
| Silicate ink from Example 16 (except 7.5% pigment chips) | Retroreflective sheeting (HIS) | #6 Mayer rod | 100% |
| | Retroreflective sheeting (HIS) | Testbed printer (MIT printhead) | 50% |
| | Retroreflective sheeting (DG) | Meyer bar coat | 100% |
| | | Testbed printer (MIT printhead) | 50–70%* |
| | Paper | Testbed printer (MIT printhead) | Not Tested |
| Silicate ink from Example 16 | Glass | #6 Mayer rod | 100% |

*Adhesion of jetted film was generally less than Mayer rod coated, the reason might have to do with the curing lamp available on the printer which was not in the preferred wavelength range for initiator used in formulation. The curing condition was a light intensity of about 11 w/cm$^2$.

Example 18

This example demonstrates the jetting of a silicone-based ink. An ink was prepared as follows.

To 5 parts Microlith R-A, were added sequentially with mixing 10 parts cyclohexanone, 20 parts 1,3-dimethyltetramethoxydisiloxane and 20 parts methacryloxypropyltrimethoxysilane are added. The mixture was mixed well to form a uniform paste, followed by addition of 40 parts silanol terminated polydimethylsiloxane gradually. The ink was ground in a ball mill using 0.3-mm diameter ceramic media for 2 hours. The ink was filtered with 1 micrometer diameter pore size glass filter. To the ink was added 5 parts RHODORSIL PHOTOINIATOR 2074. The resultant ink had a measured viscosity of 12.6 cps (mPa s).

As a control, a solution containing no Microlith R-A was also prepared by mixing solutions in the above formulation. The measured viscosity of this solution was 4.7 cps (mPa s).

Jettability of the ink was tested using Microfab printhead, which is a squeeze mood single nozzle piezoelectric inkjet printhead. The diameter of the printhead nozzle is 50 micrometer. The frequency of the jetting is 1 kHz. Pressure (P), voltages ($V_1$ and $V_2$) and pulse time ($T_1$ and $T_2$) were adjusted in order to achieve the optimal jetting condition.

Inks were filtered with 1 micrometer glass filter before loaded in the ink reservoir.

The above ink was jetted consistently at pressure −4.21 to −4.37 units, $V_1$=0 to −5, $V_2$=−100 to −95, $T_1$=100 μs, $T_2$=80 to 100 μs. The silicone solution with no pigment chip was jetted at pressure −4.49, $V_1$=−5 to −25, $V_2$=−95 to −75, $T_1$=50–80 μs, $T_2$=55–80 μs. In both cases, the larger the $V_1$ and $T_1$ the jetted droplets have less satellites formation yet longer tails. Both the ink and solution was jetted on QSIII silicone rubber. Surprisingly the solution didn't seem to flow significantly upon reaching the substrates.

Example 19

The example demonstrates inkjet printing of silicone based inks according to the present invention onto a silicone rubber substrate.

A solution was prepared using 10 parts cyclohexanone, 20 parts 1,3-dimethyltetramethoxydisiloxane, 40 parts of silanol terminated polydimethylsiloxane and 20 parts methacryloxypropyltrimethoxysilane. The solution was mixed well with a magnetic stir bar for 30 minutes.

A pigment millbase was prepared by vigorously mixing 10 parts MICROLITH R-A and 40 parts of the above solution using a blade mixer for 10–15 minutes until homogeneous. Two inks with different pigment content were prepared by diluting 2.0 parts and 2.7 parts of the millbase with 6 parts of the above solution respectively and ball milling for 60 minutes. To each of these inks was added 5 weight percent RHODORSIL PHOTOINIATOR 2074. The measured ink viscosities of these inks was 10–13 cps (mPa s). The inks were filtered through a 1 micrometer glass filter.

The inks were incorporated into a drop-on-demand inkjet printer testbed. Printed images were generated on silicone rubber QSIII. A medium mercury lamp was incorporated on the printer and radiation-cured the image while it was printed. The images were produced either by 28 of the 56 nozzles or by 52 of the 56 nozzles constantly firing. In both conditions the ink was jetted and printed on the substrate with no detectable missing lines (nozzle clogging) during the entire printing process. The resulting imagings were white lines with sharp edge definitions and reasonably good adhesion. The image with higher pigment content showed significant better color contrast to the black substrates.

Example 20

The example demonstrates inkjet printing of a silicone based ink onto a silicone release liner Ink was prepared as in Example 19. Images were produced by inkjet printing the inks onto a silicone coated release liner. The testbed was used with 52 out of 56 nozzles constantly firing. There were no detectable missing lines during printing, indicating no nozzle clogging. The resulting imaging was white lines that wet the silicone liner very well. The image exhibited good edge definition and good color contrast.

Example 21

This example demonstrates inkjet printing of a silicate ink onto retroreflective sheeting.

A solution was prepared by mixing 60 parts tetraethoxysilane and 20 parts methacryloxypropyltrimethoxysilane. The solution was mixed well with magnetic stir bar for 30 minutes.

Three parts MICROLITH C-K was added to 27 parts of the above solution and ground in a ball mill for 1–2 hours. To the mixture, 5 parts of the solution and 5 parts cyclohexanone were added and mixed with magnetic stir bar for 30 minutes. Next, 2 parts RHODORSIL PHOTOINIATOR 2074 were added and mixed for another 30 minutes. The measured viscosity of the ink was 12.8 cps (mPa s) at 1000 rpm. The ink was filtered with 1 micrometer glass filter.

The above ink was incorporated in drop-on-demand inkjet printer testbed. Images were printed on retroreflective sheeting High Intensity and Diamond Grade respectively. The printed ink was spot-cured using a medium mercury lamp (ULTRACURE 100SS PLUS obtained from ZFOS USA, Inc.) with an intensity of 11 W/cm$^2$ that followed the moving printhead and cured the image while printed. Both images were printed by constant firing of 52 out of 56 nozzles of the printhead. The resulting images were straight black lines that exhibit excellent gloss and color contrast. The image showed reasonable adhesion on the substrates.

Example 22

This example describes the preparation of a silicone based ink wherein pigment was used as colorant.

Polydiethoxysiloxane (6 parts, 8 cps (mPa s)), 2 parts methacryloxytrimethoxysilane and 0.64 parts of SILWET L77 were combined and well mixed. Gradually, 0.8 parts of COLUMBIA RAVEN 1200 FURNACE BLACK was added to solution with constant stirring. The mixture was milled in a ball mill with 12 parts 0.3 mm ceramic media at 10–20 rpm for at least 18 hours. The resulting ink was stable for at least 12 hours. RHODORSIL PHOTOINIATOR 2074 (0.24 parts) was added to the ink solution. The ink was coated on High Intensity Sheeting with a #6 Mayer bar (nominal wet thickness was 0.014 mm) and cured with a UV Processor Model MC-6ROH from Fusion U.V., Rockville, Md., using an H-type lamp at an intensity of 200 mJ/cm$^2$ and a total exposure of 128 W/cm$^2$. The coating showed 100 percent adhesion to HIS based on crosshatch 90 degree tape snap test (as in Example 3).

Example 23

This example describes the preparation of a hybrid silicone/silicate based ink wherein readily dispersible pigment was used as colorant.

PIGMENT BLUE 15:1 (0.5 parts) were mixed with 1.0 part silanol terminated polydimethysiloxane (20–30 cps (mPa s)), 6 parts polydiethoxysiloxane (8 cps (mPa s)) and 2 parts methacryloxytrimethoxysilane. The mixture was milled in a ball mill using 15 parts of 0.33 mm ceramic media at 12 rpm for 18 hours. The ink was stable for at least 12 hours. The viscosity of the resultant ink was 7.3 cps (mPa s). To the ink solution was added 0.03 parts RHODORSIL PHOTOINIATOR 2074. The ink was coated on High Intensity Sheeting with a #6 Mayer bar (nominal wet thickness was 0.014 mm) and cured as described in Example 22 with a total exposure of 384 W/cm$^2$). The coating showed 100 percent crosshatch adhesion measured by ASTM D3359-95a, test Method B.

Example 24

This example describes the preparation of a hybrid silicone/silicate based ink wherein readily dispersible pigment chip was used as colorant.

An ink vehicle solution was prepared by mixing 3 parts tetraethoxysilane with 1 part methacryloxytrimethoxysilane.

A millbase was prepared by combining 10 parts MICROLITH C-K pigment chip with 40 parts of the ink vehicle solution. The mixture was mixed with a blade mixer until homogeneous. The millbase contained 20 percent pigment chip.

Millbase (2 parts) was mixed with 6 parts the of ink vehicle solution. To the solution was added 0.24 parts silanol terminated polydimethysiloxane and 0.24 parts RHODORSIL PHOTOINIATOR 2074 was added. The ink was coated onto PYREX glass plate using a #6 Mayer Bar (nominal wet film thickness was 0.014 mm) and cured as described in Example 22 with a total exposure of 256 W/cm$^2$. The coating showed 100 percent adhesion measured by ASTM D3359-95a, test Method B. When a permanent marker pen (SHARPIE from Pen & Pencil, Inc. of Bellwood, Ill.) was used to write on the coating, the silicone-containing coating make the writing beaded up and was easily removed by simple wiping.

Example 25

This example shows the use of inks according to the invention to form durable digital images on ceramic tile. The ceramic tiles used were glazed ceramic tile 3.5 cm×3.5 cm match gloss black dots (black tiles) match navy dots (blue tiles) obtained from American Olean Tile of Butler, Wis.

Microlith R-A (3 g) was added to 27 g ink vehicle solution (TEOS/3-methacryloxypropyltrimethoxysilane at 3:1 ratio), and milled with ceramic media (0.3 mm in diameter) on rollers at 25 rpm for 4 hours. Rhodorsil photoinitiator 2074 (0.3 g) was dissolved into the ink. Optionally, the catalyst could be dissolved in cyclohexanone at 50 percent and then added to the ink.

The ink was printed with an inkjet testbed using MIT printhead at 5000 Hz, 35 V. EFOS Ultracure 100SS unit was turned on during the time of printing. Characters were printed onto the glazed ceramic tiles.

Firing

The printed samples were heated from 21C.–400° C. at heating rate of 5° C./min, then 400–1000° C. at heating rate 2.5C./min using a heating oven THERMOLYNE (by Sybron). The temperature was held at 1000° C. for 5 minutes. The samples were allowed to cool naturally to room temperature. The fired samples maintained printed pattern and color. They showed excellent adhesion to ceramic tile, good abrasion resistance, and solvent resistance.

Example 26

This example shows the use of clear-coat protected inks according to the invention to form durable digital images on ceramic tile. The ink from the previous example was printed and cured as before (no firing step) with the same inkjet testbed on retroreflective 3870 High Intensity sheeting, available from 3M Company. The cured printed sample was sprayed with the clear solution. The sample was held at approximately a 10 cm distance from the sprayer. (PREVAL SPRAYER from Precision Valve Corp. of Yonkers, N.Y.). The sprayed sample was cured using a Fusion Systems UV PROCESSOR fitted with an H-bulb (1.175 w/cm$^2$ light intensity) and having a line speed of 50 ft/min (15.2 m/min).

What is claimed is:

1. An imaged article comprising a substrate printed with a cured ink from a curable ink composition comprising a homogeneous mixture of:

at least one of: (a) a compound having 2 reactive silyl groups, and (b) a compound having at least 3 reactive silyl groups;

acid generating catalyst; and pigment or pigment chip.

2. The imaged article of claim 1 wherein the substrate is a ceramic substrate.

3. The article of claim 1 wherein the substrate comprises retroreflective sheeting, polypropylene, polyester, fluoropolymer, polyvinyl chloride, ceramic, glass, silicone treated films, or silicone rubber.

* * * * *

UNITED STATES PATENT AND TRADEMARK OFFICE
CERTIFICATE OF CORRECTION

PATENT NO. : 6,582,804 B2
DATED : June 24, 2003
INVENTOR(S) : Dong Wu

It is certified that error appears in the above-identified patent and that said Letters Patent is hereby corrected as shown below:

Column 2,
Line 6, delete "hydrolyzible" and insert in place thereof in place thereof
-- hydrolyzable --.

Column 5,
Line 33, delete "mercaptomethylmethyldiethsysilane" and insert in place thereof in place thereof -- mercaptomethylmethyldiethoxysilane --.

Column 6,
Lines 3 and 4, delete "methytriethoxysilane" and insert in place thereof in place thereof
-- methyltriethoxysilane --.
Line 61, delete "chloroproyltrimethoxysilane" and insert in place thereof in place thereof -- chloropropyltrimethoxysilane --.
Line 23, delete "bio" and insert in place thereof -- bis --.

Column 7,
Line 6, delete "care" and insert in place thereof -- cure --.
Line 11, delete "their" and insert in place thereof -- its --.
Line 37, delete "tritolysulfonium" and insert in place thereof -- tritolysulfonium --.
Line 38, delete "hexafluorantimonate" and insert in place thereof
-- hexafluoroantimonate--.
Line 6, delete "trifluoromethyl-phenyl" and insert in place thereof
-- trifluoromethylphenyl --.

Column 8,
Line 5, delete "methylphenoxathiinium" and insert in place thereof
-- 10-methylphenoxanthrenium --.
Line 7, delete "dimethylthioxanthenium" and insert in place thereof
-- dimethylthioxanthrenium --.
Lines 10 and 11, delete "oxothioxanthenium" and insert in place thereof
-- oxothioxanthrenium --.
Line 57, delete "disazobenzimidazolones" and insert in place thereof
-- diazobenzimidazolones --.
Line 58, delete the "dinitranilines".
Line 60, delete "tetracholoroisoindolinones" and insert in place thereof
-- tetracholoroisoindolinones --.

Column 9,
Line 11, delete "PR222" and insert in place thereof -- PR22 --.
Line 19, after "ink" insert -- is --.

UNITED STATES PATENT AND TRADEMARK OFFICE
CERTIFICATE OF CORRECTION

PATENT NO. : 6,582,804 B2
DATED : June 24, 2003
INVENTOR(S) : Dong Wu

It is certified that error appears in the above-identified patent and that said Letters Patent is hereby corrected as shown below:

Column 10,
Line 38, after "used" insert -- to --.

Column 14,
Line 29, delete "PHOTOINIATOR" and insert in place thereof
-- PHOTOINITIATOR --.

Column 15,
Lines 2, 16, 30, 47 and 64, delete "PHOTOINIATOR" and insert in place thereof
-- PHOTOINITIATOR --.

Column 16,
Lines 16 and 51, delete "PHOTOINIATOR" and insert in place thereof
-- PHOTOINITIATOR --.

Column 17,
Lines 17, 34, 50 and 66, delete "PHOTOINIATOR" and insert in place thereof
-- PHOTOINITIATOR --.

Column 18,
Line 51, before "." delete "are added".
Line 57, delete "PHOTOINIATOR" and insert in place thereof -- PHOTOINITIATOR --.
Line 63, delete "mood" and insert in place thereof -- mode --.
Line 66, delete "time" and insert in place thereof -- times --.

Column 19,
Line 2, before "loaded" insert -- being --
Line 9, delete "was" and insert in place thereof -- were --
Line 30, delete "PHOTOINIATOR" and insert in place thereof -- PHOTOINITIATOR --.

Column 20,
Lines 3 and 30, delete "PHOTOINIATOR" and insert in place thereof
-- PHOTOINITIATOR --.
Line 46, delete "polydimethysiloxane" and insert in place thereof
-- polydimethylsiloxane --.
Line 52, delete "PHOTOINIATOR" and insert in place thereof
-- PHOTOINITIATOR --.

UNITED STATES PATENT AND TRADEMARK OFFICE
CERTIFICATE OF CORRECTION

PATENT NO. : 6,582,804 B2
DATED : June 24, 2003
INVENTOR(S) : Dong Wu

It is certified that error appears in the above-identified patent and that said Letters Patent is hereby corrected as shown below:

Column 21,
Line 4, delete "the of" and insert in place thereof -- of the --.
Line 6, delete "polydimethysiloxane" and insert in place thereof
-- polydimethylsiloxane --.
Line 7, delete "PHOTOINIATOR" and insert in place thereof -- PHOTOINITIATOR --.
Line 15, delete "make the writing beaded up" and insert in place thereof
-- made the writing bead up --.

Column 22,
Line 1, delete "2.5C." and insert in place thereof -- 2.5° C. --

Signed and Sealed this

Third Day of August, 2004

JON W. DUDAS
*Acting Director of the United States Patent and Trademark Office*